United States Patent [19]

Hendrix

[11] 4,206,636
[45] Jun. 10, 1980

[54] FOOT PEDAL FORCE TRANSDUCER

[75] Inventor: Tony D. Hendrix, Windsor, Conn.

[73] Assignee: United Technologies Corporation, Hartford, Conn.

[21] Appl. No.: 972,550

[22] Filed: Dec. 22, 1978

[51] Int. Cl.² ............................................. G01L 5/28
[52] U.S. Cl. .................................................... 73/132
[58] Field of Search .............................. 73/132, 141 A

[56] References Cited

U.S. PATENT DOCUMENTS

| 1,684,639 | 9/1928 | Sanford | 73/132 |
| 3,577,884 | 5/1971 | Fujita | 73/141 A |

Primary Examiner—Jerry W. Myracle
Attorney, Agent, or Firm—Dominic J. Chiantera

[57] ABSTRACT

A strain gauge force transducer having a mounting surface and a bearing surface and responsive to compressive loading therebetween is attached at the mounting surface to the sole of a slipper which is adapted to releasably engage the foot of a human operator, the transducer being attached at a force transmitting portion of the sole which receives the force applied by the operator, the bearing surface of the transducer being adapted for contact with the brake pedal of an automobile, the transducer providing, in response to compressive loading resulting from the transmittal of operator-applied force from the sole to the brake pedal, a signal at a magnitude representative of the force applied by the operator to the brake pedal.

1 Claim, 4 Drawing Figures

U.S. Patent  Jun. 10, 1980  4,206,636
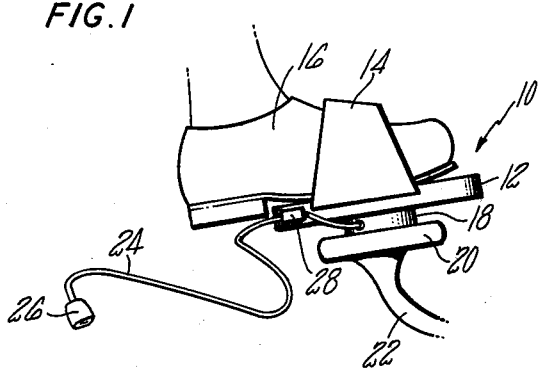
FIG. 1
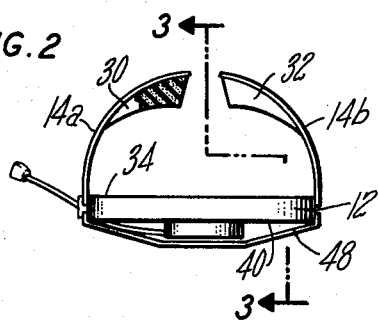
FIG. 2
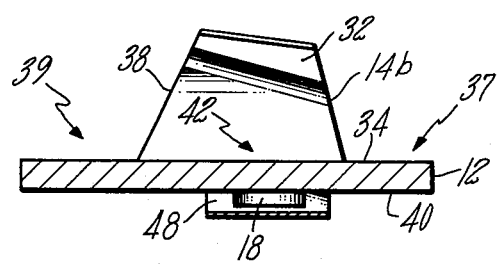
FIG. 3
FIG. 4

FOOT PEDAL FORCE TRANSDUCER

BACKGROUND OF THE INVENTION

1. Field of Invention

This invention relates to foot pedal force transducers, and more particularly to foot pedal force transducer apparatus for measuring the force applied by an operator to the brake pedal of an automobile.

2. Description of the Prior Art

Automobile diagnostic testing has significantly increased in recent years due to the interest in extending the useful life of an automobile and also due to the availability of computerized diagnostic equipment, such as AUTOSENSE ®. These diagnostic testing procedures have been adopted both by small repair garages and also by the major motor vehicle manufacturers for production testing of major systems within the vehicles to improve overall quality control and to reduce the infant mortality rate of failures inherent in new products built on large volume production lines. Similarly, the laws in many states require periodic motor vehicle inspection of safety related functions which include exhaust emissions, proper lighting, and brake systems, among the many functions which may be tested. With respect to automobile brake system testing the most practical method is an in-use type of test which tests the ability of the braking system to stop the car under some form of actual movement conditions. This may vary between actual acceleration and braking of the automobile over a short distance runway of some sort, as commonly used in state motor vehicle inspection procedures, to the use of dynamometer test stands which allow stationary acceleration of the automobile drive train to permit dynamic testing of both engine performance, exhaust emission and braking ability. Dynamometer test stands may be more prevalent among the auto manufacturers, but have found increased use among the smaller repair facilities.

The type of brake testing described here involves the use of some type of sensor which measures the force (in pounds) applied to the brake pedal of the automobile under test simultaneously with measurement of the decreased velocity and stopping time of the drive train, as may be evidenced by the measurement of the decreasing revolutions of the vehicle drive wheels on the dynamometer. The vehicle under test must be accessible to the testing apparatus, or test console and the various sensors and handheld units used with the test console, all of which are connected through umbilical cords which house the electrical interconnection between the respective devices and the test console. This is generally provided by having the sensors suspended by the umbilical cords in some sort of overhead track adjacent to the test console and dynamometer test stand. The operator performing the test from inside the automobile selects the particular testing device and draws it by its umbilical cord into the car. There is significant human engineering involved in providing the most practical design for these operator used devices to minimize the possibility of human error in performing the testing. A commonly used test stand diagnostic tool, in addition to the brake sensor, is a handheld keyboard which allows for communication between the operator in the car and the test console while the car is in dynamic test on the dynamometer. Although there has been significant emphasis on providing the most efficient design for the handheld keyboards to permit easy access by the operator in and out of the automobile and to simplify as much as possible the operating procedures such that the units may be used by semi-skilled persons, little has been provided in the way of simplification of sensor equipment for measuring the automobile braking system.

Typical of the presently used brake testing sensors is a handheld foot pedal force transducer having a hollow shaft housing, approximately two feet long, which includes a base plate rigidly attached at a right angle to the bottom of the shaft. A movable faceplate is hinged at the furthest extension of the base plate from the shaft and is connected at the other end to a spring mechanism inside the shaft housing. The spring mechanism includes a main spring having a defined spring constant (K) and one or more balancing springs to provide a quiescent position for the movable face-place when no force is applied to the plate. In using this device the operator must hold the transducer such that the base plate is aligned in position on the face of the brake pedal, and then apply braking force with his foot to the movable faceplate causing it to compress against the main spring to some position which allows transmission of the applied foot force through the base plate to the brake pedal. The magnitude of the force applied is proportional to the spring constant and the travel distance of the spring. The spring is attached to the wiper of a potentiometer and the force magnitude is read out as a voltage signal at a magnitude proportional to that of the applied force. This device has a number of disadvantages including inaccuracy of force measurement and limited practical utility. Although this type of transducer has been in use for many years the inherent measurement inaccuracies in this mechanical structure which uses springs and potentiometer linkages is obvious when compared to the present availability of solid state type transducers, i.e. thin-film piezoresistive type transducers which are available for measurement of both compression and tensile forces. This is particularly important when the diagnostic test equipment itself has an inherent high accuracy which is then limited to the inaccuracy of such a mechanical type device. Further inaccuracies may result if the operator fails to properly align the base plate such that it rests flat on the brake pedal. If it is skewed the operator may have to apply a greater force to brake the vehicle, resulting in an inaccurate high force reading. In addition, the use of this type of handheld transducer preceded the more recent testing procedures which use handheld keyboard units for communicating with the test stand, such that an operator finds it impossible to perform the brake test procedure with the present type of transducer while at the same time making data entries into the handheld unit. Alternatively, if not concerned with simultaneous brake system measurement and data entry, the present handheld transducer does not allow the operator to keep both hands on the steering wheel, which does not permit simulation of actual use conditions and which may present a safety hazard in the brake test procedure when the automobile is being accelerated on the dynamometer stand.

Another available type of force transducer for measuring brake force, which is not handheld and which is far more accurate than the handheld type device, is a strain gauge sensor. This is typically a piezoresistive type which is provided with a clamp for mounting the strain gauge directly on the surface of the brake pedal.

This device, which is semi-stationary, finds utility in developmental type testing where a single automobile is extensively tested for evaluation of new designs, including brake systems, such that the relatively fixed attachment of the sensor to the pedal is acceptable in view of the extended period of test. As may be obvious, however, this type of device does not have practical utility in the production line type of diagnostic testing or in the motor vehicle test procedures, both of which may require the testing of successive automobiles at a rate on the order of two to three minutes each.

SUMMARY OF THE INVENTION

The object of the present invention is to provide a foot pedal force transducer for measuring, in a natural way, the braking force applied by a human operator to the brake pedal of an automobile.

According to the present invention, a piezoresistive force transducer having two parallel major surfaces including a mounting surface and a bearing surface and which is responsive to compressive loading between the surfaces, is attached at the mounting surface to the outer surface of the sole of a slipper designed to easily attach to the foot of a human test operator, the transducer bearing surface being adapted for contact with the automobile brake pedal, the operator applying brake pedal force to the sole of the slipper which is transmitted through the transducer to the bearing surface in contact with the face of the pedal, the transducer providing a signal at a magnitude representative of the force applied to the brake pedal as compressively transmitted through the transducer. In further accord with the present invention, the slipper is provided with a target band on the surface of the upper portion which engages the foot of the human operator to provide a visual aid to the operator in aligning the bearing surface of the transducer with the face of the brake pedal.

The foot pedal force transducer of the present invention permits the measurement of required brake pedal force in a natural type of measurement interface, by sensing the force at the point of application while allowing the freedom of the operator to place both hands on the steering wheel. This permits the application of the brake pedal force in the same manner as would be applied in actual use, further enhancing the accuracy of the test. The piezoresistive transducer provides a highly accurate signal representative of the force magnitude. All of these, and other objects, features and advantages of the present invention will become more apparent in the light of the following detailed description of a preferred embodiment thereof, as illustrated in the accompanying drawing.

BRIEF DESCRIPTION OF THE DRAWING

FIG. 1 is an illustration of the use of the foot pedal force transducer of the present invention;

FIG. 2 is an illustration of an end view, partially in section, of one embodiment of the foot pedal force transducer of the present invention;

FIG. 3 is a sectioned, side elevation view of the embodiment of FIG. 2; and

FIG. 4 is a top view of the embodiment of FIGS. 2, 3.

DETAILED DESCRIPTION

Referring to FIG. 1, in an illustration of the in-use application of the foot pedal force transducer of the present invention, the transducer 10 includes a slipper having a base place, or sole 12 and an upper portion 14 in the form of a strap or sheath, which is attached to the sole and which is adapted to releasably engage the foot 16 of the human operator. The transducer includes a piezoresistive strain gauge 18 attached to the bottom surface of the sole in a region which is coextensive with a force transmitting portion of the sole, namely that portion of the sole which engages, generally, the ball of the foot of the operator. The strain gauge has two planar parallel major surfaces including a mounting surface attached to the sole and a bearing surface adapted for contact with the face of the brake pedal 20 of the automobile brake pedal assembly 22. The strain gauge provides the transmission path for the force applied by the operator, from the force transmitting portion of the sole to the brake pedal 20. As such the strain gauge is compressively loaded by the entire applied force. The entire force applied by the operator is distributed across the bearing surface of the strain gauge which is in contact with the brake pedal. The strain gauge provides a signal at a magnitude representative of the force applied through interconnecting lines included in an umbilical cord 24, which includes a plug 26 for interconnecting the transducer 10 with the diagnostic test equipment. The cord 24 is typically attached through a strain relief clamp 28 to the sole 12 to prevent the cord from breaking away from the strain gauge housing.

The transducer 10 is adapted for quickly engaging and releasing the operator's foot, such that the transducer is quickly put on or taken off as may be required for the production line diagnostic testing. Since the brake test procedure involves a relatively short time interval and, for a high volume diagnostic test line, a comparatively high frequency of use (two to three minute intervals) the present foot pedal force transducer provides for a highly practical device since it may be quickly slipped on or off the operator's foot. An illustrative, detailed embodiment of the foot pedal force transducer of the present invention is illustrated in FIGS. 2-4. In the end view of FIG. 2 the upper portion 14 is provided with a two-piece shell-like cover having two complementary segments, or portions 14a, 14b, each attached to the sole 12. The two portions provide a split, flexible cover. Each portion includes compressible material, such as foam rubber inserts 30, 32 bonded to the inner surface, and each portion comprises a flexible, springy type of material which yields to the insertion of the operator's foot by expanding outwardly, such that the foot may be easily inserted. With the foot inserted the cover portions, in the expanded state, provide a slight compressive force downwardly through the foam rubber inserts to the top of the operator's foot such that the foot remains engaged to the inside surface 34 of the sole of the slipper. The cover portions 14a, 14b may be formed from a plastic material having the desired flexibility or from a springy type of corrosive resistant metal, the resistance to corrosion being necessary due to the garage environment in which the transducer is used. Metal may be preferred since it is more durable and resistant to shock as a result of dropping and so on. One metal which would be satisfactory for providing both corrosion resistance and also the required springy characteristics is AISI-414 stainless spring steel. The cover portions formed from the stainless steel would have a wall thickness on the order of 0.050 inches.

The base plate, or sole 12 has a generally rectangular shape and is formed from a durable, lightweight material which can withstand the shocks resulting from dropping and yet be comfortable on the operator's foot. Preferably the sole comprises an aluminum plate with a plate thickness on the order of 0.125 inches. The length and width dimension of the sole are based on human engineering factors and are selected to accommodate a range of foot sizes. The segmented shell portions 14a, 14b of the slipper, with the foam rubber inserts 30, 32 are also designed to fit a range of foot sizes, and may even be provided with sufficient flexibility to allow the gripping of a shoeless foot. Preferably, although not necessary, the sole length may be limited to provide for fitting forward of the heel of the operator's foot, thereby eliminating unnecessary weight. Similarly, if preferred, the sole 12 may be provided with a hollowed-out portion 36 which allows for the formation of a handle, or grip, for pulling on the slipper to the operator's foot. As illustrated in the sectioned, side elevation view of FIG. 3, the foam inserts, as shown by the insert 32, are preferably tapered to provide a greater foam thickness at the toe end 37 of the slipper. Similarly, the segmented cover portion 14b has a greater edge taper 38 at the heel end 39 of the sole to allow easy fit of the slipper to the foot.

The strain gauge 18 is attached to the bottom surface 40 of the sole in that region of the bottom surface which is coextensive with, or in register with the force transmitting portion 42 of the sole. As stated hereinbefore this portion of the sole generally engages the ball of the operator's foot, which is generally the force transmitting portion of the operator's foot. As more clearly shown in FIG. 4 the force transmitting portion 42 and the strain gauge transducer 18 mounted within that portion are positioned from the heel end 39 of the sole at a distance generally related to the location of the ball of the foot in a range of foot sizes. As an aid in aligning the force transmitting portion and transducer with the faceplate of the brake pedal, a target band 44 is painted across the outer surface of the two shell portions 14a, 14b. In this manner the operator may easily target the location of the sole 12 on the faceplate of the brake pedal.

The strain gauge 18 is of a piezoresistive type known in the art, such as the Entran Devices, Inc. Model ELF-1000 Series flat line load cell, which is responsive to compressive forces up to a maximum full scale force selectable in various ranges. Typically the full scale range of the strain gauge transducer for the brake pedal measurements is on the order of 100 pounds maximum, although any higher or lower range may be selected depending upon the expected range of measurement values. The strain gauge may be excited from either a DC or AC power supply and provides a DC signal at a magnitude directly proportional to the induced compressive load across the gauge. The strain gauge excitation and also the output signal from the strain gauge is provided through the umbilical cord 24 connected to the external diagnostic equipment console (not shown), and the cord may be connected to the sole 12 through a strain relief clamp 46 to prevent a tearing away of the umbilical cord from the transducer during repeated use. The strain gauge transducer has a sufficiently wide bearing surface area to permit a uniform distribution of the applied force to the surface of the pedal 20. Similarly, to prevent the skewing of the operator's foot in applying brake pedal pressure the strain gauge structure should have a sufficiently thin dimension between the mounting and bearing surfaces. The typical width-to-thickness dimension as provided by the referenced Entran strain gauge is on the order of 7:1, the device having an overall width of one inch and a dimension between the two planar surfaces which is on the order of 0.15 inches. A slightly larger ratio may be preferred to ensure a sufficiently wide bearing surface area. The strain gauge is attached to the sole in a manner which does not cause a quiescent compressive loading of the gauge. This may be provided in a number of known methods, such as through a screw attachment provided on the strain gauge into a threaded tap in the metal sole, or through bonding with a high strength adhesive such as Eastman-910.

To protect the transducer from sheer forces which may be generated as a result of scuffing the sole of the slipper and also to protect the gauge from any excessive wear, a shield 48 may be placed across the bearing surface of the strain gauge. The shield is attached on each end to the sole and is drawn across the bearing surface of the strain gauge in a loosely fitting manner, such that the shield does not apply any compressive loading to the strain gauge. The width of the shield is slightly larger than that of the strain gauge itself such that the gauge is recessed within the enclosed shield area thereby preventing any direct sheer forces from being applied to the strain gauge. The shield may comprise some type of noncorrosive, durable metal such as stainless steel.

The foot pedal force transducer of the present invention provides for the measurement of applied brake pedal force through a natural measurement interface, i.e. measurement of the direct force applied by the foot of the operator to the brake pedal surface. It does not require any placement or alignment of a separate strain gauge device between the pedal and the operator's foot as typical of the prior art devices described hereinbefore. The operator simply applies the brake pedal pressure in the same manner as provided in normal operation of the car. The slipper portion of the foot pedal force transducer is adapted to easily slip on and off the operator's foot and accommodates a range of foot sizes. As a further aid in allowing visual alignment and targeting of the strain gauge directly on the surface of the brake pedal a target band is provided on the upper portion of the slipper allowing easy visual alignment of the strain gauge to the brake pedal. The slipper structure may take additional forms in providing the same characteristic of releasably engaging the operator's foot. The upper portion, or strap 14, may be provided from some sort of durable fabric having elastic qualities to provide the slight compressive loading on the operator's foot to allow the foot to be engaged to the sole. Similarly the bottom surface of the sole may be provided with platforms at the toe end and heel end of the sole which permit the operator to walk about the test stand in between the brake pedal measurement test performed on successive automobiles. Similarly, although the invention has been shown and described with respect to an illustrative embodiment thereof, it should be understood by those skilled in the art that the foregoing and various other changes, omissions and additions in the form and detail thereof may be made therein without departing from the spirit and the scope of the invention.

Having thus described a typical embodiment of my invention, that which I claim as new and desire to secure by Letters Patent is:

1. A foot pedal force transducer for providing signals representative of the force applied by the foot of a human operator to a brake pedal of an automobile, comprising:
  a slipper having a sole with an inner surface and an outer surface, and having an upper portion attached to the sole and adapted for releasably engaging the foot of the operator to the inner surface in a region thereof forming a force transmitting portion of the sole, said upper portion having an exterior surface with a target band disposed thereon in register with said force transmitting portion of said sole; and
  strain gauge means having two parallel planar major surfaces including a mounting surface and a bearing surface and responsive to compressive loading therebetween, said gauge means being attached at said mounting surface to said outer surface of said sole in a region thereof coextensive with said force transmitting portion of said sole, said bearing surface being adapted for contact with the brake pedal, said target band providing a visual indication of said gauge position to permit operator alignment of said bearing surface with the brake pedal, said gauge means providing a transmitting path for the force applied by the operator, from said force transmitting portion of said sole to the brake pedal, said gauge means providing, in response to the compressive loading between said mounting surface and said bearing surface resulting from the transmission of the force applied by the operator, a signal at a magnitude representative of the force applied to the brake pedal.

* * * * *